United States Patent [19]

Miyada

[11] Patent Number: 4,598,931
[45] Date of Patent: Jul. 8, 1986

[54] INERTIAL SAFETY NET SYSTEM

[76] Inventor: Thomas S. Miyada, P.O. Box 430, Summit, N.J. 07901

[21] Appl. No.: 693,679

[22] Filed: Jan. 22, 1985

[51] Int. Cl.[4] .............................................. B60R 21/06
[52] U.S. Cl. .................................. 280/749; 280/753; 180/282
[58] Field of Search ...................... 280/751, 748, 749; 280/753; 180/749

[56] References Cited

U.S. PATENT DOCUMENTS

| | | | |
|---|---|---|---|
| 2,025,822 | 12/1935 | Pryor | 280/749 |
| 2,942,913 | 6/1960 | Felts | 280/749 |
| 3,814,459 | 6/1974 | Eckels | 280/753 |
| 4,300,788 | 11/1981 | Sperling | 280/753 |
| 4,488,691 | 12/1984 | Lorch | 280/89 |
| 4,500,135 | 2/1985 | Kincheloe | 280/751 |
| 4,538,832 | 9/1985 | Anderson | 280/801 |

Primary Examiner—John J. Love
Assistant Examiner—Karin L. Ferriter

[57] ABSTRACT

A safety device for a vehicle that uses inertia to prevent the upper body of an occupant from colliding with the windshield. A pair of bars are slidingly held to the underside of the vehicle's roof. The bars each have a row of gear teeth in engagement with a semi-circular gear. A net is secured to the semi-circular gears so that as inertia causes the sliding bars to move forward the gears turn and introduce the net between the occupants and the windshield. A ratchet wheel assembly prevents the safety device from moving backwards unless the pawls are manually released.

4 Claims, 14 Drawing Figures

U.S. Patent  Jul. 8, 1986  Sheet 1 of 3  4,598,931
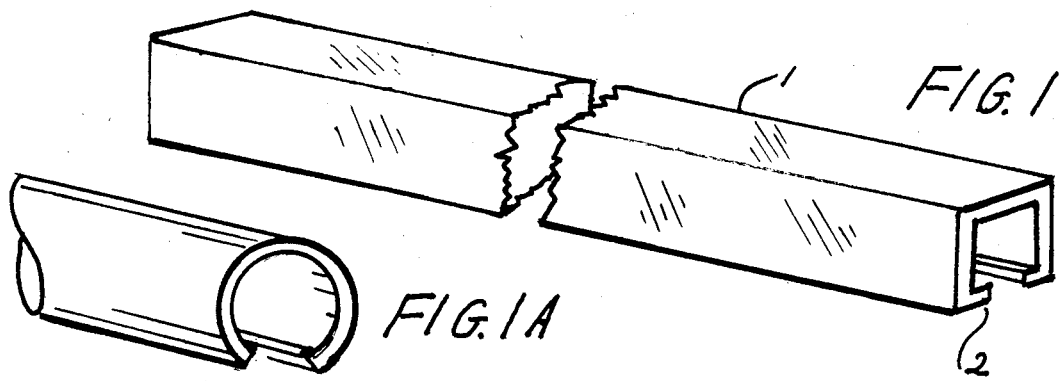
FIG. 1
FIG. 1A
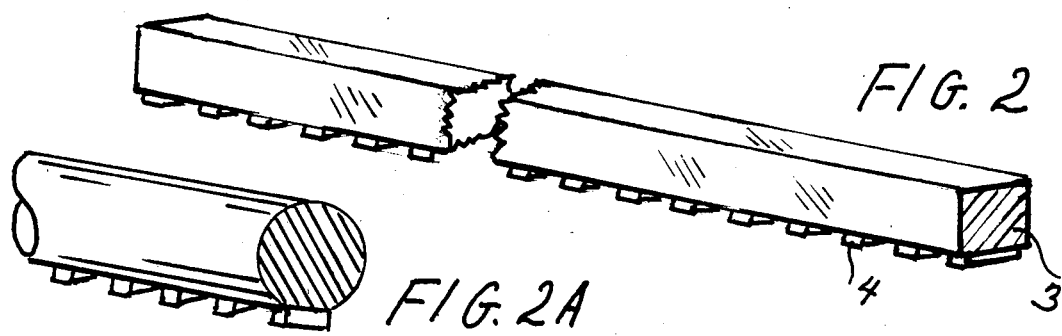
FIG. 2
FIG. 2A
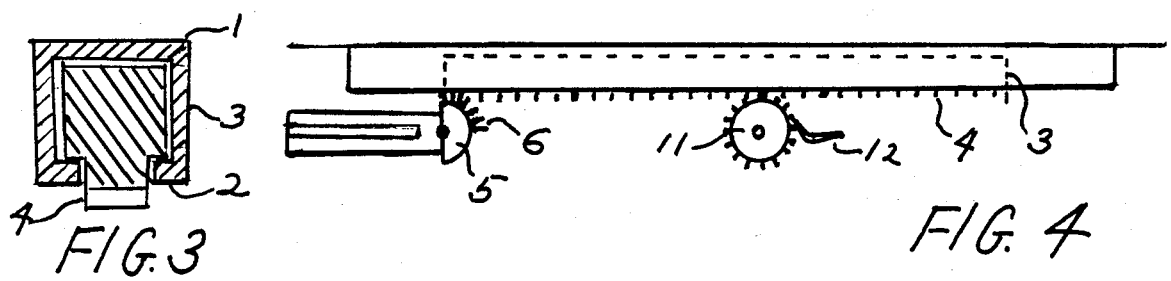
FIG. 3
FIG. 4
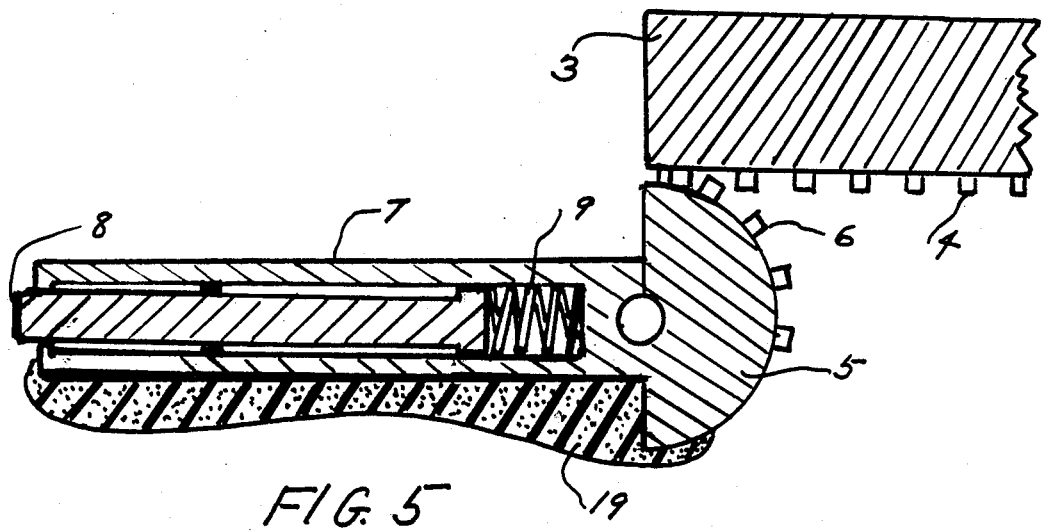
FIG. 5

INERTIAL SAFETY NET SYSTEM

FIELD OF THE PRESENT INVENTION

The present invention relates to a safety net designed to catch or restrain the forward movement of a vehicle's front seat occupants should the vehicle suddenly decelerates or stops. Broadly speaking, it is in the field of mechanical safety devices.

The object of the present invention is to prevent the occupants of the vehicle's front seat from being thrown against the windshield when their speeding vehicle suddenly stops by providing a safety net that comes down between the front seat riders and the windshield without the help of electricity, magnetism, or human intervention. The retracting and resetting of the hardwares and the net are done manually in leisure. The other object of the invention is to provide a device that shall not take too much space and that can be made of simple and inexpensive parts which the average man and woman can afford.

This invention has a pair of long straight solid bars installed horizontally and slidingly in a holder attached to the underside of the vehicle's roof, one on the left side and the other on the right side of the vehicle, and running parallel to the longitudinal line of the vehicle. Each bar is provided with a row of gear teeth under its bottom side. A short distance from the top part of the windshield under the car's roof are a pair of semi-wheels, one on the left side and the other on the right side of the car, that are equipped with gear teeth and in mesh with those of the horizontal straight long solid bars. Each semi-wheel has enough gear teeth to cause it to turn 90 degrees and has extensions on its side to hold a safety net or nets. When the vehicle suddenly stops in an accident, the said horizontal long straight solid bar slides forward with considerable speed and force by virtue of inertia. Since the said bars are in gear or mesh with those of the said semi-wheels, the latter turn 90 degrees and cause the safety nets held in their extensions to be almost instantly introduced between the vehicle's windshield and the front seat riders without any help from human hands.

One of the important features of this invention that makes it unique and that should be emphasized is the way the safety nets get introduced between the front seat occupants and the vehicle's windshield without knocking down or striking anyone. If the taut safety net is installed near the vehicle's roof and is to move downward, its advance edge will strike the front seat occupants' heads for the latter will be moving forward in an accident. If the safety net is installed near the floor of the vehicle, and is to move upward to protect the passengers, its upper taut edge will strike the chins and other parts of the riders with considerable force for the latter are also moving forward in an accident. If the safety nets are located on either or both sides of the vehicle, they will strike the riders sidewise. In this invention, the taut safety nets are attached to the semi-wheels' extensions in a horizontal position under the forward section of the front roof. The horizontal extensions carrying the nets move in a 90 degrees circle downward from the front side. The nets will meet the front seat riders, who are thrown forward, from the front side only, and naturally no head, chin, or side of the passengers will be struck.

DRAWINGS

FIG. 1 shows the pipelike holder.

FIG. 1A shows another embodiment of the holder shown in FIG. 1.

FIG. 2 shows the sliding bar.

FIG. 2A is that of another embodiment of the bar shown in FIG. 2.

FIG. 3 cross sectional view of the pipelike holder containing and holding the straight solid bar.

FIG. 4 Relative locations of the pipelike holder (1), the straight solid bar (3), the semi wheel (5) and its extension (7).

FIG. 5 gives an enlarged view of the semi-wheel and its extension that holds the safety net, and a part of the horizontally positioned straight solid bar in mesh with the semi-wheel—all in an inactive state.

Figure 6:
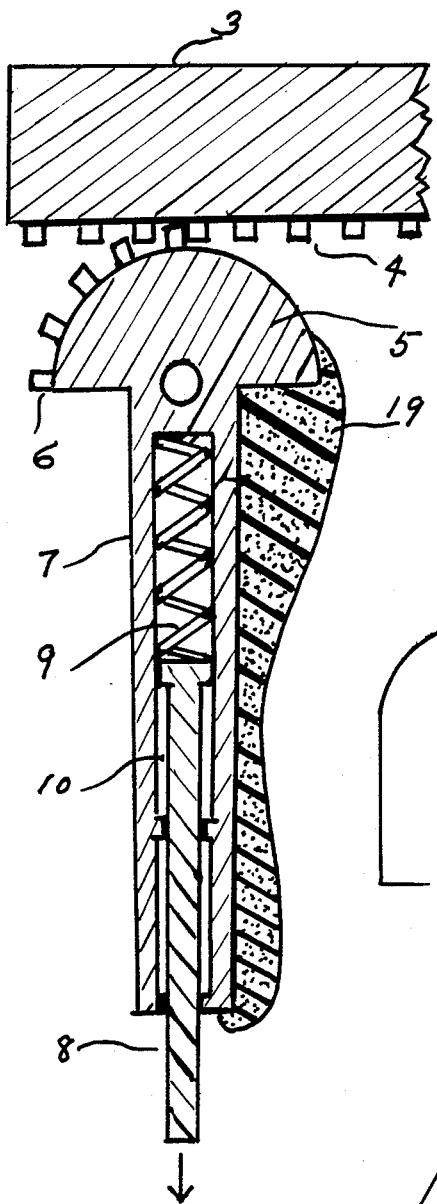

FIG. 6 shows the wheel and its extension after the sliding bar has moved forward.

Figure 7:
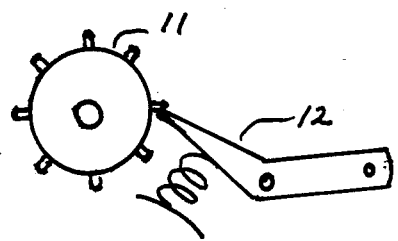

FIG. 7 shows the retracting wheel and the pawl.

Figure 8:
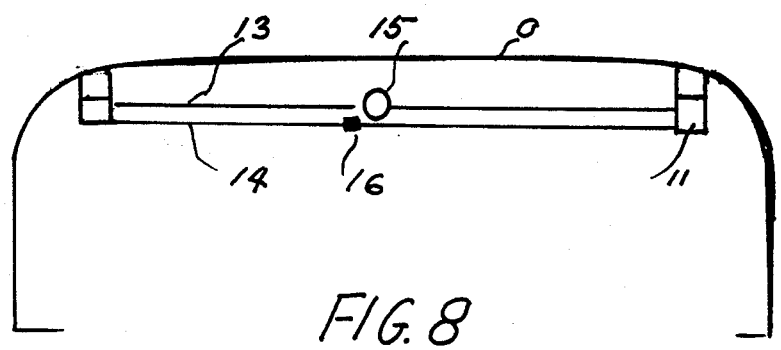

FIG. 8 Relative locations of the ratchet and retracting wheel, pawl, the rods, and the gear.

Figure 9:
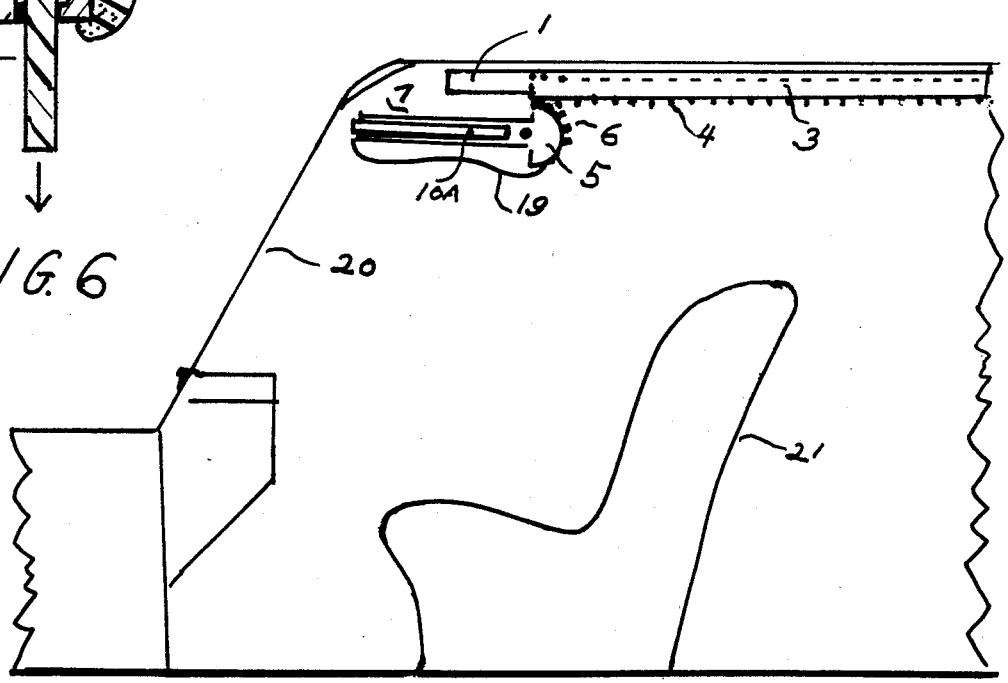

FIG. 9 shows the relative positions of the various parts of the Inertial Safety Net System in an inactive state. The locations of the windshield and the front seat are shown. The horizontal extension pointing leftward from the semi-wheel is the device that holds the safety net. The windshield is identified as 20.

Figure 10:
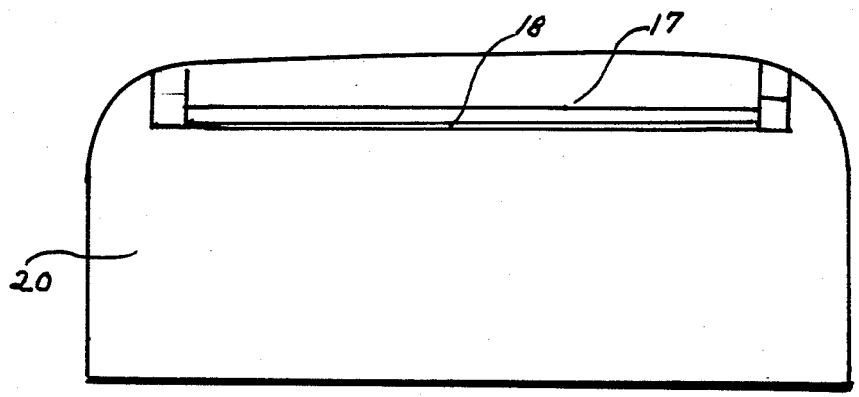

FIG. 10 shows the safety net system as seen by the occupants of the front seat.

Figure 11:
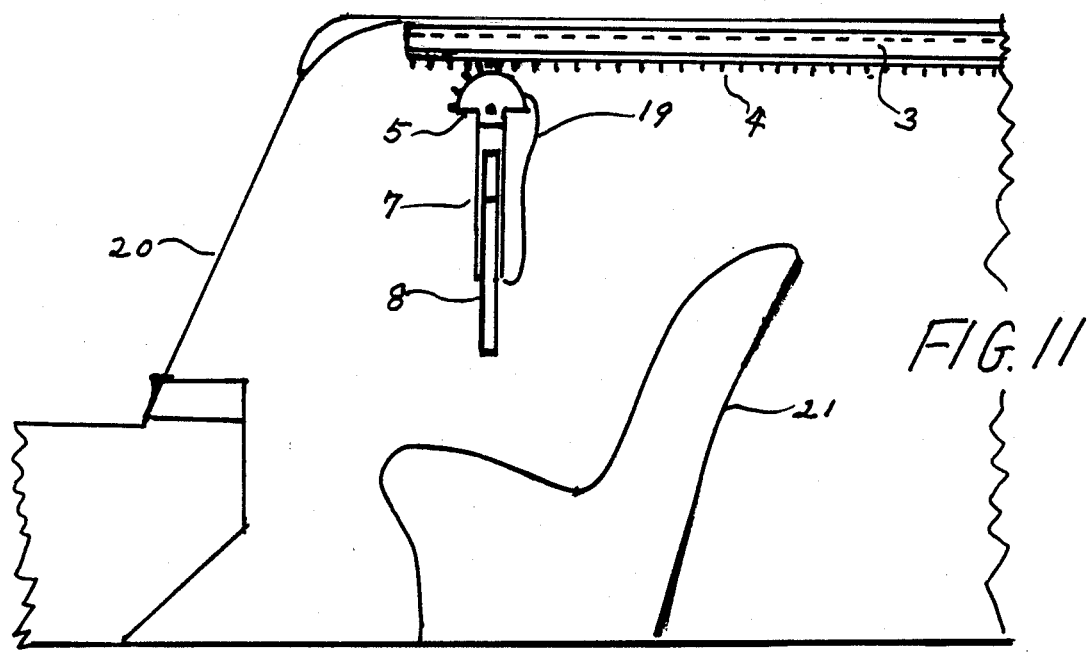

FIG. 11 shows the various parts of the Inertial safety Net System at an instant following the sudden stoppage of a speeding vehicle. The geared straight solid bar has moved forward to the left and has turned the geared semi-wheel and the extension that holds the safety net 90 degrees counterclockwise in the picture. The semi-wheel and the extension shown in a vertical position in the drawing is actually located very close to the side of the vehicle and out of the way of the front seat occupants.

Figure 12:
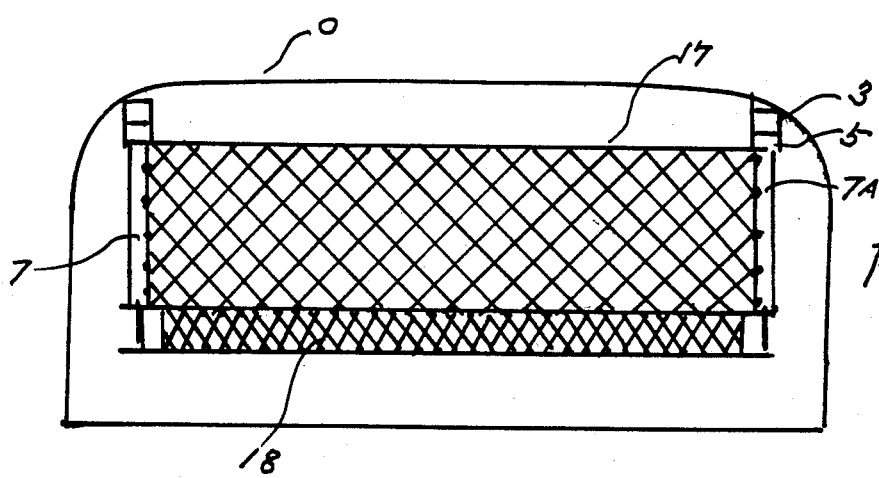

FIG. 12 shows what is seen in FIG. 11, as seen from the front seat of the vehicle. The safety nets are stretched between the front seat and the windshield, and the semi-wheels and their hard extensions are out of the way on the left and the right sides of the vehicle, with absolutely no metal or hard object ever touching anyone. The top net is the primary net, and the bottom net is the secondary.

The windshield is numbered as 20 and the vehicle's seat as 21.

Detailed description of the invention follows:

Under the front section of the vehicle's roof (0) and extending horizontally and parallel to the longitudinal line of the vehicle are attached two pipe-like holders (1), one on the left side and the other on the right side of the vehicle. In the preferred embodiment, the pipe-like holders are rectangular in cross section. A square, circular or other shapes may be used. It may extend to about half the length of the vehicle's roof or shorter or longer. In its installed position, the bottom side of the pipe-like holder has no wall and is open throughout its length, and has two ridge-like retainers (2) to prevent its content from slipping out. Shown in FIG. 1.

A straight solid bar (3), almost the length of the said pipe-like holder, and having the shape of, but smaller than, the said pipe-like holder is provided. It has a ridge on its bottom side (in the installed position) running the full length, and has thereon a row of gear teeth (4) as shown in FIG. 2. A pair of the said straight bars are installed, one placed in the said left pipe-like holder (1) and the other in the right pipe-like holder, wherein they can move or slide forward or backward.

The said straight bars are normally made of heavy solid metal, but they can be made with hollow rectangular, square, circular, or other shaped pipe filled with sand, liquid, and even lead, and then sealed.

Near the forward tip of the said horizontal straight solid bar (3) and just below it, a semi-wheel (5 in FIG. 5) with its gear teeth (6) is securely installed. Its gears are meshed with those of the said straight solid bar (3).

A semi-wheel in this specification is a wheel-like device (5) with about 180 degrees of its rim and radial side removed, but retaining a full hub and at least 180 degrees of its radial side and rim. Its rim is provided with just enough gear teeth to cause it to turn 90 degrees and no more.

A pair of semi-wheels is installed: one under the left side and the other under the right side of the vehicle's roof (0).

Each semi-wheel has a primary extension that protrudes from the side where the rim and the radial side have been removed. It is made of very strong rigid material and is constructed with a hollow space (10), which holds a secondary extension. A spring is provided to hold up the secondary extension within the primary extension. The spring is shown as 9 in the drawing.

When not in action, the semi-wheel is in gear or mesh with the foremost gears of the straight solid bar (3), and the extensions are in a horizontal position pointing toward the windshield but not touching it. The primary extensions are provided with means (7A) to hold the primary safety net (17) securely and in a very taut condition.

A vertical slit (10A) running down the primary extension permits the passage of the secondary safety net (18).

There are two safety nets (17 and 18). The primary safety net (17) stretches across the car tautly from the left primary extension (7) to the right primary extension.

The secondary safety net (18) stretches across the vehicle from the left secondary extension, through the slit (10A) in the left primary extension, to the right slit (A') of the right primary extension and to the right secondary extension. (8).

Both nets are coated with foam rubber or similar substance.

The mechanical parts described herein above are necessary for the 100% automatic introduction of the safety nets between the front seat occupants and the windshield of the vehicle.

EXTRA SAFETY DEVICE

Normally the driver and riders are not in contact with, nor leaning against the sides of the vehicle, but this invention assumes that they are. As a precautionary measure to prevent any contact of the rider with hard objects near the vehicle's sides, those parts of the semi-wheels and the extensions that face rearward when in vertical position are equipped with thick paddings of soft or foam rubber (19).

HOW THE SYSTEM WORKS

When a speeding vehicle suddenly stops in a collision or other accident, the long straight solid bar (3) suddenly moves forward with considerable force and speed by virtue of inertia. The gear teeth at the bottom of the straight solid bar (3) are in mesh with those of the semi-wheel (5).

Since there are just enough gear teeth (6) on the semi-wheel (5) to cause it to turn 90 degrees and the solid straight bar cannot move beyond the end wall of the holder (1), the semi-wheels turn 90 degrees and their horizontally positioned extensions also turn 90 degrees to assume a vertical position. (FIG. 6)

Since the primary safety net (17) is held tautly by the primary extensions (7) of the left and the right semi-wheels (5), the primary net (17) will also turn 90 degrees from a horizontal position under the front roof (0) to a vertical position infront the front seat occupants.

If the vehicle was speeding too fast when it stopped, the centrifugal reaction caused by the primary extensions' turning 90 degrees will cause the secondary extensions (8) and their nets (18) to swing out from the end of the primary extensions (7) to give an additional protection to the riders of the vehicle The secondary net (18) need not remain in its vertical position. In an accident involving a sudden stoppage, protection is needed for only a fraction of a second following the collision or stoppage, and very rarely a second. The secondary net is automatically pulled back into the primary extension by a built-in spring (9).

RESETTING OF THE SAFETY NET FOR THE NEXT EMERGENCY

Although accidents do not occur everyday, it is prudent to be prepared for it every minute. After the sudden stoppage, collision, or accident, it is advisable tht the safety net system is reset for the next accident. Wheels, pawls, gears, and rods are provided for manual and mechanical resetting, which can be done in less than one minute by touching button turning a handle.

At about the midsection of the said straight solid bar (3) with its gear in mesh with those of the said solid bar is a retracting wheel, which when turned rearward after an accident will retract the straight solid bar (3) to its original resting position. There are two of these wheels: one under the left solid bar and the other under the right solid bar. The two retracting wheels are connected with a rod (13), which has at its midsection a worm gear (15) with a turning handle, which when turned cause the two straight solid bars (3) to return to their resting position within the holder (1) and at the same time return the nets to their horizontal position under the roof (0).

The retracting wheel (11) also serves as a ratchet wheel in combination with a pawl (12) located nearby. As a ratchet wheel with its pawl it prevents the straight solid bar from sliding backward after the nets are in protective position. There are two pawls, one next to the left retractive-ratchet wheel and the other near the right retractive-ratchet wheel, and are also connected together with a rod (14), which has at its midsection a button (16), which in construction is similar to other conventional mechanical buttons and which when touched, releases the pawls to permit the retracting.

It is understood that the foregoing descriptions are those of the exemplary or preferred embodiment of the invention, and variation can be made within reason and without departing from the mechanical principle and spirit of the invention.

Having thus described my invention and having illustrated the same in the accompanying drawings, I hereby claim for the purpose of securing letters patent therefor the followings:

1. An inertial safety net system for vehicles which causes a safety net to be introduced between the vehicle's front seat riders and the vehicle's windshield, comprising:
    (a) two pipe-like holders installed under the vehicle's roof, each having an opening in one side and a retaining ridge along the opening for holding within the pipe-like holder a long straight bar;
    (b) two long straight bars, each bar having a row of gear teeth along one side, wherein said straight bar is held slidingly in said holder with the row of gear teeth protruding through the opening of each of said holders;
    (c) two semi-wheels secured to the vehicle's roof adjacent said bars each of said wheels having a hub and a perimeter defining a curved section and a straight section so that said perimeter has a substantially semicircular shape wherein said curved section has a plurality of gear teeth disposed thereon adapted to engage said row of gear teeth on said bars so that when said bars move forward said wheels turn about 90°;
    (d) two primary extensions, each primary extension attached to and protruding from the straight section of each semi-wheel, wherein said extensions are movable from a horizontal position near the vehicle's roof to a vertical position in front of the front seat and the riders when said wheels turn 90 degrees in response to the inertial movement of the straight solid bar; and
    (e) a rectangular primary net having a left short side securely attached to one primary extension and a right short side securely attached to the other primary extension, wherein said net is movable with the semi-wheels from a horizontal position below the roof to a vertical position between the passenger and the windshield.

2. The inertial safety net system as claimed in claim 1 also comprising:
    (a) two secondary extensions;
    (b) means for receiving and movably holding said secondary extensions within said primary extensions and wherein said primary extensions include a longitudinal slit therein; and
    (c) a rectangular secondary safety net having one short side securely attached to a secondary extension and on other short side securely attached to the other secondary extension, wherein said secondary net provides an extra width of safety net when the deceleration of the vehicle is abrupt.

3. The inertial safety net system as claimed in claim 1 also comprising:
    (a) two retracting wheels which in combination with two pawls function as rachet wheels to prevent the straight bars from sliding backward wherein one retracting wheel is in contact with one of said straight bars and the other in contact with the other straight bar, and wherein the two pawls are connected with a rod, said rod having means to release the pawls from the retracting wheels thereby permitting the retracting wheels to turn and retract the long straight bars.

4. The inertial safety net system as claimed in claim 1 also comprising
    (a) a soft rubber padding fixed to one side of each semi-wheel and the primary extension.

* * * * *